Patented July 11, 1939

2,166,073

UNITED STATES PATENT OFFICE 2,166,073

PROCESS OF PREPARING BILIRUBIN

Jules D. Porsche, Edwin F. Pike, and John L. Gabby, Chicago, Ill., assignors to Armour and Company, Chicago, Ill., a corporation of Illinois No Drawing. Application October 1, 1937, Serial No. 166,888

8 Claims. (Cl. 260—313)

This invention relates to processes of preparing bilirubin and it comprises processes wherein bilirubin-containing mixtures, such as a mixture of bilirubin and bile acids, is admixed with a liquid chlorinated aromatic hydrocarbon to preferentially dissolve the bilirubin, and the bilirubin recovered from its solution in the chlorinated hydrocarbon, and it further comprises processes wherein animal bile, such as hog bile, is reacted with an alkaline earth metal oxide or hydroxide to convert the bilirubin therein to its alkaline earth metal salt, the reaction mixture then treated with acetic acid and a liquid chlorinated aromatic hydrocarbon, the mixture filtered, and the bilirubin recovered from its solution in the chlorinated hydrocarbon.

Bilirubin is an orange red substance appearing in bile and accounts for the golden red color of the bile. Recently medical authorities have recommended its use in the treatment of arthritis, and it has been used as a test reagent in testing liver functioning. Bilirubin has hitherto been prepared from gall stones, generally gall stones of beef gall bladders, and, consequently, the material has been very expensive. When preparing bilirubin from gall stones the general procedure is to extract the stones with ether to remove fats, cholesterol, and other ether soluble substances, then wash the residue, or ether insoluble portions, with dilute acetic acid, glacial acetic acid, and water, and finally extract the washed and dried residue with chloroform. This solvent dissolves the bilirubin, and it can be crystallized therefrom.

The gall stone method is expensive, and we have sought a method which would be less costly and which would give higher yields of bilirubin of greater purity. And we have discovered processes by means of which bilirubin can be isolated from animal bile. Animal bile, in addition to containing bilirubin, also contains bile acids. One of the problems in utilizing bile as a source of bilirubin is that of separatng the bilirubin from the bile acids. We have discovered a class of solvents which will preferentially dissolve the bilirubin to the exclusion of the bile acids and as a result of our discovery we are able to isolate bilirubin from bile without obtaining a material highly contaminated by bile acids.

In broadest aspects our invention resides in the use of normally liquid chlorinated aromatic hydrocarbons, or mixtures thereof, as preferential solvents to dissolve bilirubin from its mixture with bile acids and other materials insoluble in the chlorinated hydrocarbon. There are many chlorinated aromatic hydrocarbons we can use, such as mono and di-chlorinated benzene, the liquid chlorinated toluenes and xylenes, and the liquid chlorinated naphthalenes. The chlorinated aliphatic hydrocarbons, such as chloroform and ethylene dichloride are unsatisfactory because they either dissolve bile acids, as in the case of ethylene dichloride, or they tend to break down the bilirubin, as in the case of chloroform if not specially purified.

In more specific aspects we have discovered that special ways of treating animal bile are especially well adapted to the use of our preferential solvents. These ways consist in first converting the bilirubin in the bile to alkaline earth metal salts, such as the calcium, barium, or magnesium salts, and then liberating the bilirubin therefrom while in the presence of relatively large volumes of our chlorinated aromatic hydrocarbons. Under these conditions the bilirubin dissolves in the solvent leaving inorganic alkaline earth acetates, bile acids, bile acid salts and many other impurities behind as an insoluble residue. From the solution we can recover a crude, waxy product from which crystalline bilirubin may be obtained by the addition of alcohol.

We shall now describe our invention in more specific detail.

To 25 gallons of hog bile, or other animal bile we add 25 gallons of water and mix well. To this mixture we then add 5 pounds of slacked lime (calcium hydroxide) with stirring, and finally let the mixture stand for two or three days. The purpose of the lime is to convert the bilirubin in the bile to calcium bilirubinate. Bile acids present are also converted to their calcium salts. As stated, other alkaline earth hydroxides or oxides can be used since the object is to form insoluble bilirubin salts. Treatment with the lime is at room temperature and the reaction mixture is allowed to stand for a period long enough to allow the insoluble bilirubinate to form and settle as a precipitate. After settling is complete the supernatant liquor is syphoned off and discarded. The precipitate can, of course, be filtered if desired, but settling is entirely satisfactory.

The insoluble precipitate is next dried on a drum drier or in vacuum pans at a temperature of about 120° to 160° F. This dry material contains free calcium hydroxide, calcium carbonate, calcium salts of bile acids, and calcium bilirubinate. It is not new with use to react bile with lime to form calcium bilirubinate in admixture with calcium salts of bile acids, but hitherto no one has been able to separate the bilirubin from the bile acids in a commercially satisfactory way. Our invention is primarily directed to this separation step.

We next mix about 13 to 15 pounds of the dried calcium bilirubinate-containing mixture with about 6.5 gallons of monochlorbenzene. This gives us a suspension of the dried bilirubinate precipitate in the chlorinated aromatic hydrocarbon. To this suspension we add a mixture of about 3 quarts of glacial acetic acid and about 3 quarts of monochlorbenzene with vigorous agitation. The mixture is stirred for about an hour and then filtered through filter paper. The filtrate is a monochlorbenzene solution of bilirubin and the residue on the filter paper consists of calcium acetate, bile salts, and other impurities which are insoluble in the solvent. The function of the acetic acid is to liberate bilirubin from its calcium salts and the function of the monochlorbenzene is to dissolve the bilirubin without dissolving appreciable quantities of bile acids also liberated from their calcium salts.

The filtrate is then evaporated to dryness in vacuo at a temperature of about 100° to 115° F. The residue is a brown, waxy solid consisting mostly of bilirubin, some few fatty impurities, and relatively small amounts of bile acids. The residue is then mixed with about 2 quarts of 95 percent ethyl alcohol, or a denatured alcohol, such as 90 percent ethyl, 5 percent methyl and 5 percent water. In this mixture the bilirubin is insoluble although most of the small amounts of impurities present are soluble. The bilirubin separates out of the alcohol as a brick red precipitate which is collected on a suction filter, washed with alcohol and ether, and dried.

Although, as stated, we can use other liquid chlorinated aromatic hydrocarbons, monochlorbenzene is the best because it has a low boiling point and can be evaporated readily. We do not, however, wish to be limited to monochlorbenzene. Nor do we wish to be limited to the precise proportions given above since these can be varied widely without departing from the principles of our invention. When treating the original bile with the alkaline material enough thereof is added so that a slight excess is present. This is to insure that all of the bilirubin in the bile is converted to its alkaline earth metal salt. Likewise enough glacial acetic acid is added so that all of the calcium bilirubinate is decomposed with the liberation of the free bilirubin.

The glacial acetic acid need not first be admixed with about an equal volume of monochlorbenzene before addition to the mixture of calcium bilirubinate and monochlorbenzene, but we find that it is better to preliminarily "dilute" the acid with a small quantity of the solvent.

Our solvents can be used for separating bilirubin from its mixture with bile acids made in other ways. Consequently, we claim our invention broadly with reference to this feature of our invention.

Having thus described our invention what we claim is:

1. The process of obtaining bilirubin from admixtures of bile salts with salts of bilirubin which comprises acidifying the mixture of bile salts and bilirubin salts, mixing the acidified mixture with a normally liquid chlorinated aromatic hydrocarbon to dissolve the bilirubin liberated from its salt as a result of the acidification, but without dissolving the acidified bile salts, and then separating the insoluble materials from the solution of bilirubin.

2. The process as in claim 1 wherein the chlorinated hydrocarbon is monochlorbenzene.

3. The process of preparing bilirubin which comprises adding an alkaline earth metal hydroxide to animal bile to convert the bilirubin therein to an insoluble alkaline earth metal salt, separating the precipitate of bilirubin salt from the supernatant liquor, admixing the precipitate with a normally liquid chlorinated aromatic hydrocarbon and with glacial acetic acid to liberate free bilirubin, and recovering the bilirubin from its solution in the chlorinated hydrocarbon.

4. The process as in claim 3 wherein the chlorinated hydrocarbon is a liquid chlorinated benzene.

5. The process as in claim 3 wherein the chlorinated hydrocarbon is monochlorbenzene.

6. The process of preparing bilirubin from animal bile which comprises converting the bilirubin therein to an alkaline earth metal salt, and liberating bilirubin therefrom while the salt is in suspension in a normally liquid chlorinated aromatic hydrocarbon.

7. The process as in claim 6 wherein the chlorinated hydrocarbon is a liquid chlorinated benzene.

8. The process as in claim 6 wherein the chlorinated hydrocarbon is monochlorbenzene.

JULES D. PORSCHE.
EDWIN F. PIKE.
JOHN L. GABBY.